United States Patent
Shimakami

(10) Patent No.: US 11,697,359 B2
(45) Date of Patent: Jul. 11, 2023

(54) DISTANCE-TO-EMPTY PRESENTATION APPARATUS AND PRESENTATION METHOD OF DISTANCE TO EMPTY

(71) Applicant: TOYOTA JIDOSHA KABUSHIKI KAISHA, Toyota (JP)

(72) Inventor: Shinichi Shimakami, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 205 days.

(21) Appl. No.: 17/148,713

(22) Filed: Jan. 14, 2021

(65) Prior Publication Data

US 2021/0229571 A1    Jul. 29, 2021

(30) Foreign Application Priority Data

Jan. 29, 2020 (JP) .................................. 2020-012298

(51) Int. Cl.
  *B60L 58/30* (2019.01)
  *B60W 20/20* (2016.01)
  (Continued)

(52) U.S. Cl.
  CPC ............. *B60L 58/30* (2019.02); *B60W 20/20* (2013.01); *B60W 20/40* (2013.01); *G01C 21/3469* (2013.01)

(58) Field of Classification Search
  CPC ....... B60L 58/30; B60W 20/20; B60W 20/40; G01C 21/3469
  See application file for complete search history.

(56) References Cited

U.S. PATENT DOCUMENTS

| 2013/0253740 A1* | 9/2013 | Kim ........................ B60L 1/003 701/123 |
| 2014/0278038 A1* | 9/2014 | Stankoulov ........... G06T 11/203 701/123 |
| 2016/0180612 A1* | 6/2016 | Wittliff .................. G06Q 10/06 701/123 |

FOREIGN PATENT DOCUMENTS

| JP | S58-63814 A | 4/1983 |
| JP | 2000-046587 A | 2/2000 |

(Continued)

*Primary Examiner* — Vivek D Koppikar
*Assistant Examiner* — Godfrey Aleksander Maciorowski
(74) *Attorney, Agent, or Firm* — Finnegan, Henderson, Farabow, Garrett & Dunner, LLP

(57) ABSTRACT

A distance-to-empty presentation apparatus of a fuel cell vehicle includes: a traveling speed acquisition unit configured to acquire a traveling speed of the fuel cell vehicle; a traveling distance acquisition unit configured to acquire a traveling distance of the fuel cell vehicle in a fuel filling period, the fuel filling period is a period from the time when the fuel is filled in the fuel cell vehicle previously to the time when the fuel is filled in the fuel cell vehicle this time; a fuel residual amount acquisition unit configured to acquire a fuel residual amount of the fuel cell vehicle; a fuel consumption amount acquisition unit configured to acquire a fuel consumption amount of the fuel cell vehicle; a fuel efficiency calculation unit configured to calculate fuel filling period fuel efficiency by using the traveling distance in the fuel filling period and a traveling period fuel consumption amount that is the fuel consumption amount during traveling preparation and during traveling in the fuel filling period, wherein the fuel filling period fuel efficiency is fuel efficiency in the fuel filling period; a distance-to-empty calculation unit configured to calculate a distance to empty of the fuel cell vehicle by using the fuel filling period fuel effi- (Continued)

ciency and the fuel residual amount; and a presentation device configured to present the distance to empty.

5 Claims, 5 Drawing Sheets

(51) Int. Cl.
*B60W 20/40* (2016.01)
*G01C 21/34* (2006.01)

(56) References Cited

FOREIGN PATENT DOCUMENTS

| | | |
|---|---|---|
| JP | 2004-063205 A | 2/2004 |
| JP | 2004-153958 A | 5/2004 |
| JP | 2011-033447 A | 2/2011 |
| JP | 2014-212649 A | 11/2014 |
| JP | 2015-010867 A | 1/2015 |
| JP | 2015-141126 A | 8/2015 |

* cited by examiner

DISTANCE-TO-EMPTY PRESENTATION APPARATUS AND PRESENTATION METHOD OF DISTANCE TO EMPTY

CROSS REFERENCE TO RELATED APPLICATIONS

The present application claims the benefit of priority to Japanese Patent Application No. 2020-012298 filed on Jan. 29, 2020, the entire contents of which are incorporated herein by reference.

BACKGROUND

Field

The present disclosure relates to a distance-to-empty presentation apparatus and a presentation method of a distance to empty.

Related Art

There is known a technology of calculating a distance to empty of a vehicle by using an energy predicted consumption rate that is calculated using an energy consumption amount and a vehicle speed of the vehicle for each time unit, and an energy residual amount such as a power storage amount of a battery (for example, Japanese Patent Application No. 2014-212649).

Although an electric vehicle and a fuel cell vehicle are common in a point that energy for vehicle traveling energy is electricity, they have different modes of energy source, and therefore, a distance to empty in a fuel cell vehicle cannot be calculated appropriately with conventional technologies.

SUMMARY

According to an aspect of the present disclosure, a distance-to-empty presentation apparatus of a fuel cell vehicle is provided. This distance-to-empty presentation apparatus includes: a traveling speed acquisition unit configured to acquire a traveling speed of the fuel cell vehicle; a traveling distance acquisition unit configured to acquire a traveling distance of the fuel cell vehicle in a fuel filling period, the fuel filling period is a period from the time when the fuel is filled in the fuel cell vehicle previously to the time when the fuel is filled in the fuel cell vehicle this time; a fuel residual amount acquisition unit configured to acquire a fuel residual amount of the fuel cell vehicle; a fuel consumption amount acquisition unit configured to acquire a fuel consumption amount of the fuel cell vehicle; a fuel efficiency calculation unit configured to calculate fuel filling period fuel efficiency by using the traveling distance in the fuel filling period and a traveling period fuel consumption amount that is the fuel consumption amount during traveling preparation and during traveling in the fuel filling period, wherein the fuel filling period fuel efficiency is fuel efficiency in the fuel filling period; a distance-to-empty calculation unit configured to calculate a distance to empty of the fuel cell vehicle by using the fuel filling period fuel efficiency and the fuel residual amount; and a presentation device configured to present the distance to empty that has been calculated. According to the distance-to-empty presentation apparatus of this aspect, the fuel filling period fuel efficiency is calculated by using the traveling period fuel consumption amount when the fuel cell vehicle is in traveling preparation or traveling. The fuel filling period fuel efficiency is calculated by using the fuel consumption amount used in the traveling without including the fuel consumption amount at the time of vehicle stop. Therefore, an appropriate distance to empty based on the fuel consumption amount necessary for vehicle traveling can be calculated and presented.

DETAILED DESCRIPTION

A. First Embodiment

Figure 1:
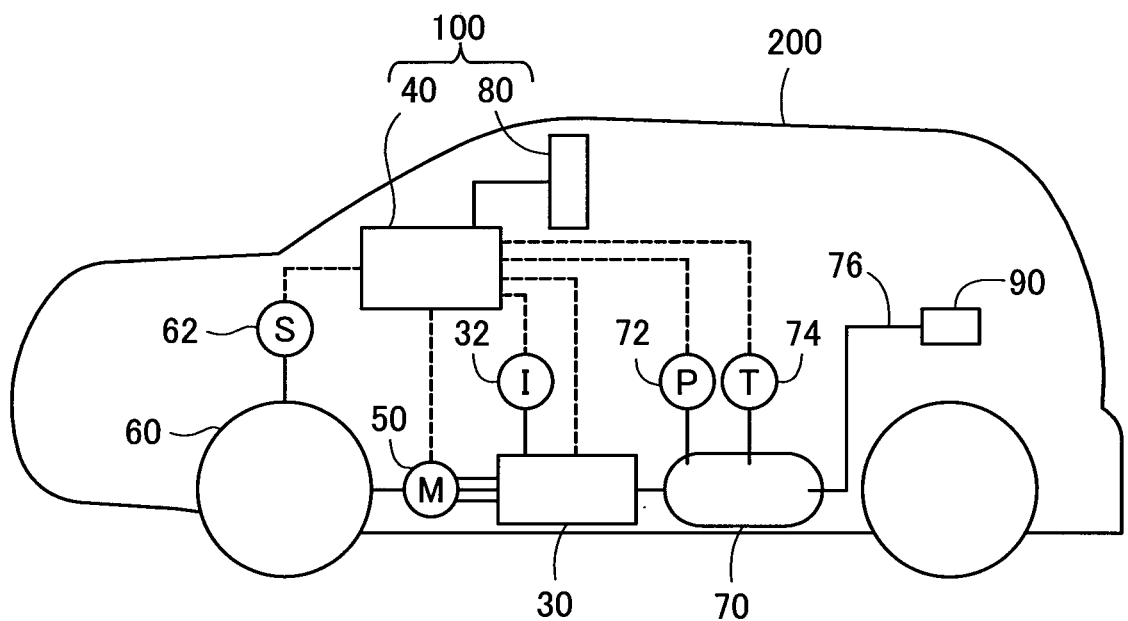
FIG. 1 is an explanatory diagram showing a configuration of a vehicle.

FIG. 1 is an explanatory diagram showing a configuration of a vehicle 200 including a distance-to-empty presentation apparatus 100 of the present embodiment. The vehicle 200 is a fuel cell vehicle that travels using an electric power obtained by power generation by a fuel cell 30. The vehicle 200 includes the distance-to-empty presentation apparatus 100, the fuel cell 30, a fuel tank 70, a drive motor 50, a wheel 60, and a receptacle 90. The distance-to-empty presentation apparatus 100 includes a control device 40 and a presentation device 80. The vehicle 200 may include a secondary cell that functions as a power source with respect to a load of a drive motor or the like.

The fuel cell 30 is a solid polymer type fuel cell that generates power by receiving, as a reaction gas, air supplied from the outside of the vehicle 200 and a fuel gas supplied from the fuel tank 70. For example, a fuel cell stack is used as the fuel cell 30, in the fuel cell stack, a plurality of single cells sandwiched a Membrane Electrode Assembly (MEA) by a pair of gas separators formed with a flow path of the reaction gas being laminated. The fuel cell 30 is provided with a current sensor 32 for detecting a current value of a generated power by the fuel cell 30. The vehicle 200 travels by driving the drive motor 50 by electric power obtained by the fuel cell 30 and rotating the wheel 60 by a drive force of the drive motor 50. The wheel 60 is provided with a wheel speed sensor 62 for acquiring a rotation speed of the wheel 60 per a unit time. Detection results of the current sensor 32 and the wheel speed sensor 62 are output to the control device 40.

The fuel tank 70 is filled with a high-pressure fuel gas (hereinafter, also simply referred to as "fuel"). The fuel tank 70 is provided with a pressure sensor 72 that acquires a pressure of the fuel in the fuel tank 70, and a temperature sensor 74 that acquires a temperature of the fuel of the fuel tank 70. Detection results of the pressure sensor 72 and the temperature sensor 74 are output to the control device 40. The fuel tank 70 is connected to the receptacle 90 via a pipe path 76. The receptacle 90 is connected to a gas supply source such as a hydrogen station (not shown), for example, and is used to supply the fuel to the fuel tank 70.

The control device 40 is a microcomputer including a central processing unit (CPU) (not shown) and a memory. For example, the memory includes a ROM and a RAM in which reading and writing can be performed. The CPU executes a program stored in the memory to achieve a function of each part described later to perform presentation control of a distance to empty.

The presentation device 80 presents a distance to empty of the vehicle 200. In the present embodiment, a liquid crystal panel that displays the distance to empty is used as the presentation device 80. The distance to empty means a distance in which the vehicle 200 can travel using a fuel residual amount. The presentation device 80 may present the distance to empty by sound in addition to display on the liquid crystal panel or instead of display on the liquid crystal panel. The presentation device 80 may present not only the distance to empty but also various types of information such as a traveling speed, a traveling distance, fuel efficiency, a residual amount of the fuel and the like of the vehicle 200.

Figure 2:
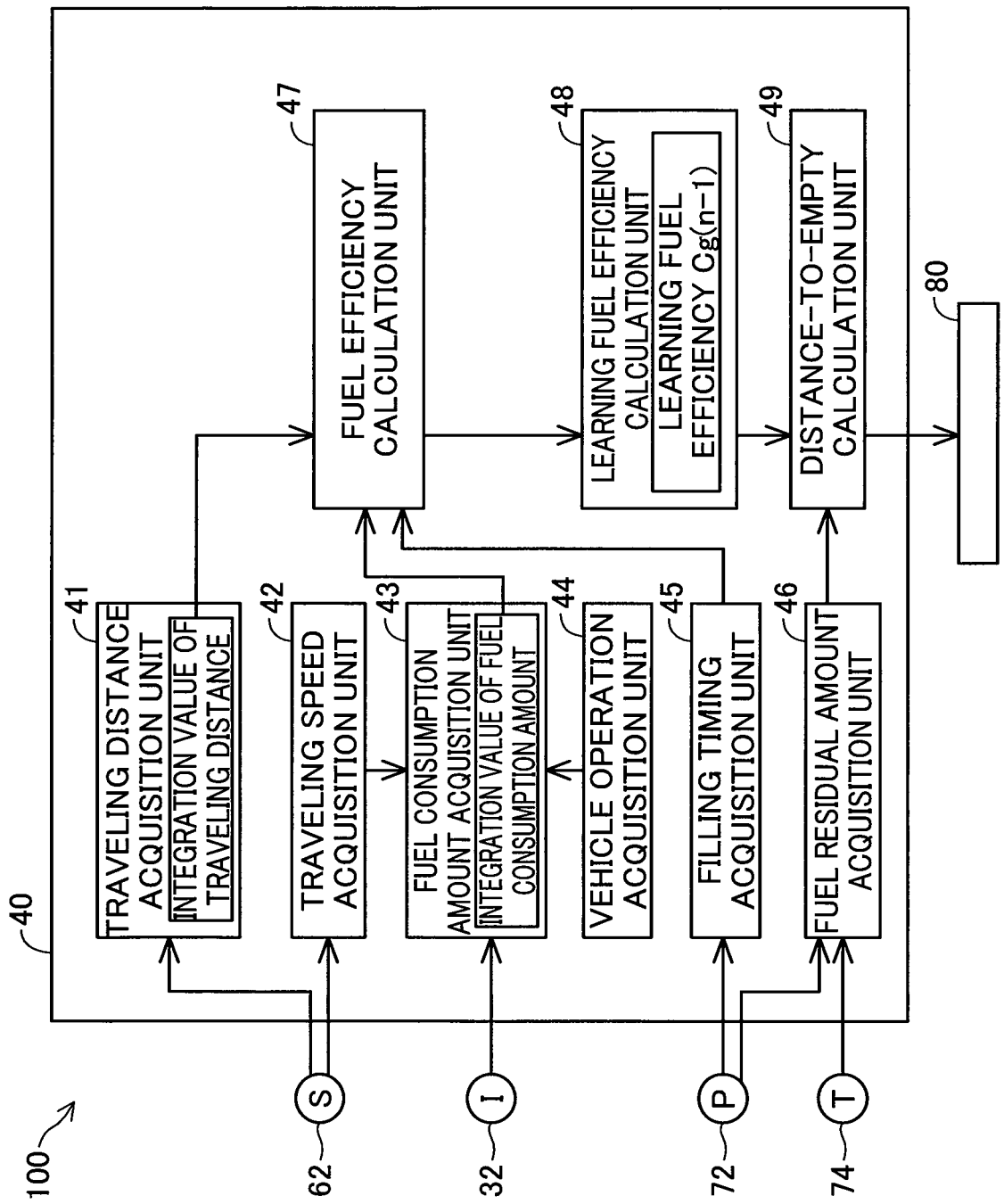
FIG. 2 is a block diagram representing a functional configuration of a control device.

FIG. 2 is a block diagram schematically representing a functional configuration of the control device 40. The control device 40 includes a traveling distance acquisition unit 41, a traveling speed acquisition unit 42, a fuel consumption amount acquisition unit 43, a vehicle operation acquisition unit 44, a filling timing acquisition unit 45, a fuel residual amount acquisition unit 46, a fuel efficiency calculation unit 47, a learning fuel efficiency calculation unit 48, and a distance-to-empty calculation unit 49.

The traveling distance acquisition unit 41 calculates a traveling distance of the vehicle 200. More specifically, the traveling distance acquisition unit 41 multiplies a rotation speed of the wheel 60 per a unit time acquired from the wheel speed sensor 62 by a circumference length of the wheel 60 to calculate and integrate the travel distance of the vehicle 200 per a unit time. For example, the traveling distance acquisition unit 41 may acquire the traveling distance of the vehicle 200 by using the Global Navigation Satellite System (GNSS). In the present embodiment, as described later, the traveling distance acquisition unit 41 integrates the traveling distance when conditions (hereinafter, also referred to as "integration conditions) for determining whether the traveling distance and the fuel consumption amount are integrated are met, and causes the memory to store an integration value of the traveling distance.

The traveling speed acquisition unit 42 calculates the traveling speed of the vehicle 200. More specifically, the traveling speed acquisition unit 42 calculates the traveling speed of the vehicle 200 for each unit time by using the traveling distance of the vehicle 200 per a unit time calculated by the traveling distance acquisition unit 41.

The fuel consumption amount acquisition unit 43 calculates a fuel consumption amount of the vehicle 200. In the present embodiment, a correspondence map using a correlation between a current value output from the fuel cell 30 when the fuel cell 30 generates power and a fuel consumption amount consumed in power generation of the fuel cell 30 is used for calculation of the fuel consumption amount. The fuel consumption amount acquisition unit 43 acquires from the current sensor 32 a current value output from the fuel cell 30, and uses the acquired current value and the correspondence map to derive the fuel consumption amount. In the present embodiment, as described later, when integration conditions are met, the fuel consumption amount acquisition unit 43 integrates the fuel consumption amount and causes the memory to store an integration value of the fuel consumption amount. The fuel consumption amount may be derived by, in addition to using the current value output from the fuel cell 30, using a pressure in the fuel tank 70 acquired by the pressure sensor 72, such as calculation from the change amount of pressure with respect to the pressure when the fuel tank 70 is filled to be full, for example. The fuel consumption amount may be calculated by using an internal pressure in the fuel tank 70 and a fuel temperature in the fuel tank 70 acquired by the temperature sensor 74.

The vehicle operation acquisition unit 44 acquires an operation state of each part of the vehicle 200. For example, the operation state of each part of the vehicle 200 includes a traveling or stop state of the vehicle 200, an operation state of the fuel cell 30, and an abnormal state in which an outside power supply mode and an emergency power supply mode of supplying electric power to the outside by using the fuel cell 30 or a secondary cell mounted to the vehicle 200 or a diagnosis code is output. The vehicle operation acquisition unit 44 acquires a command signal from the control device 40 to each part of the vehicle 200, a flag of each part of the vehicle 200, connection between an outside power supply plug included in the vehicle 200 and an outside load, a position of a key switch of the vehicle 200 to acquire the operation state of each part of the vehicle 200. For example, the operation state of the fuel cell 30 includes a state where purging processing or warming processing of the fuel cell 30 is being performed. For example, low-temperature environments such as a below freezing point, the warming processing of the fuel cell 30 is processing increasing the density of an anode gas at the time of starting the fuel cell 30 to warm the fuel cell 30. The purging processing of the fuel cell 30 is processing which circulates the reaction gas in the pipe path connected to the fuel cell 30 and fuel cell 30 at the time of operation end of the vehicle 200 so as to prevent blockade of a pipe path of the reaction gas by the generation of water of the fuel cell 30 In the purging processing or warming processing of the fuel cell 30, fuel may be consumed.

The filling timing acquisition unit 45 acquires a timing at which the fuel is filled in the fuel tank 70. The filling timing acquisition unit 45 determines that the fuel has been filled in the fuel tank 70 when detecting that a filling nozzle is mounted to the receptacle 90 and a pressure in the fuel tank 70 acquired from the pressure sensor 72 is a predetermined threshold or more. The filling timing acquisition unit 45 outputs a time when the filling timing acquisition unit 45 determines that the fuel has been filled to the fuel efficiency calculation unit 47 as a filling timing. For example, the filling timing acquisition unit 45 may determine that the fuel has been filled when detecting that a lid of the vehicle 200 is opened.

The fuel residual amount acquisition unit 46 acquires a residual amount of the fuel in the fuel tank 70. More specifically, the fuel residual amount acquisition unit 46 calculates the residual amount of the fuel by using a pressure of the fuel in the fuel tank 70 acquired from the pressure sensor 72 and a temperature of the fuel in the fuel tank 70 acquired from the temperature sensor 74. The residual amount of the fuel may be derived using the correspondence map of the pressure and temperature of the fuel and the residual amount of the fuel, and may be calculated using a gas state equation. The fuel residual amount acquisition unit 46 may calculate the residual amount of the fuel by subtracting the fuel consumption amount calculated by the fuel consumption acquisition unit 43 from a current value output from the fuel cell 30 from a full filling amount of the fuel tank 70. The fuel residual amount acquisition unit 46 may calculate the residual amount of the fuel from a weight of the fuel tank 70 by acquiring the weight of the fuel tank 70. The fuel residual amount acquisition unit 46 outputs the calculated residual amount of the fuel to the distance-to-empty calculation unit 49.

The fuel consumption calculation unit 47 calculates fuel filling period fuel consumption. The fuel filling period fuel consumption means fuel consumption calculated by using an integration value of the traveling distance and an integration value of the fuel consumption amount of the vehicle 200 in a period from when the fuel is filled in the vehicle 200 previously until when the fuel is filled in the vehicle 200 this time (hereinafter, also referred to as "fuel filling period). The fuel filling period is also referred to as a "trip". The fuel efficiency means a distance in which the vehicle 200 can travel using a fuel per a unit capacity. As shown in FIG. 2, the fuel efficiency calculation unit 47 acquires an integration value of the traveling distance from the traveling distance acquisition unit 41 and acquires an integration value of the fuel consumption amount from the fuel consumption amount acquisition unit 43. The fuel efficiency calculation unit 47 calculates the fuel filling period fuel efficiency by dividing the integration value of the traveling distance in the fuel filling period by the integration value of the fuel consumption amount in the fuel filling period.

The learning fuel efficiency calculation unit 48 calculates learning fuel efficiency of this time by using a weighted average of fuel filling period fuel efficiency in a fuel filling period of this time and learning fuel efficiency calculated previously. For example, the learning fuel efficiency of this time is calculated by using Equation (1) below.

$$Cg(n)=k1 \cdot Cg(n-1)+(1-k1) \cdot Cr \qquad \text{Equation (1):}$$

k1: Predetermined coefficient
Cg(n): Learning fuel efficiency of this time
Cg(n−1): Learning fuel efficiency calculated previously
Cr: Fuel filling period fuel efficiency in fuel filling period of this time k1 is a coefficient used for weighting. The coefficient k1 may be set arbitrary on the basis of a degree of significance of the learning fuel efficiency Cg(n−1) and the fuel filling period fuel efficiency Cr in a range from zero or more to one or less.

The distance-to-empty calculation unit 49 calculates a distance to empty by using the learning fuel efficiency Cg(n) calculated by the learning fuel efficiency calculation unit 48 and the residual amount of the fuel acquired from the fuel residual amount acquisition unit 46. The distance-to-empty calculation unit 49 outputs the calculated distance to empty to the presentation device 80, and the presentation device 80 presents the input distance to empty.

Figure 3:
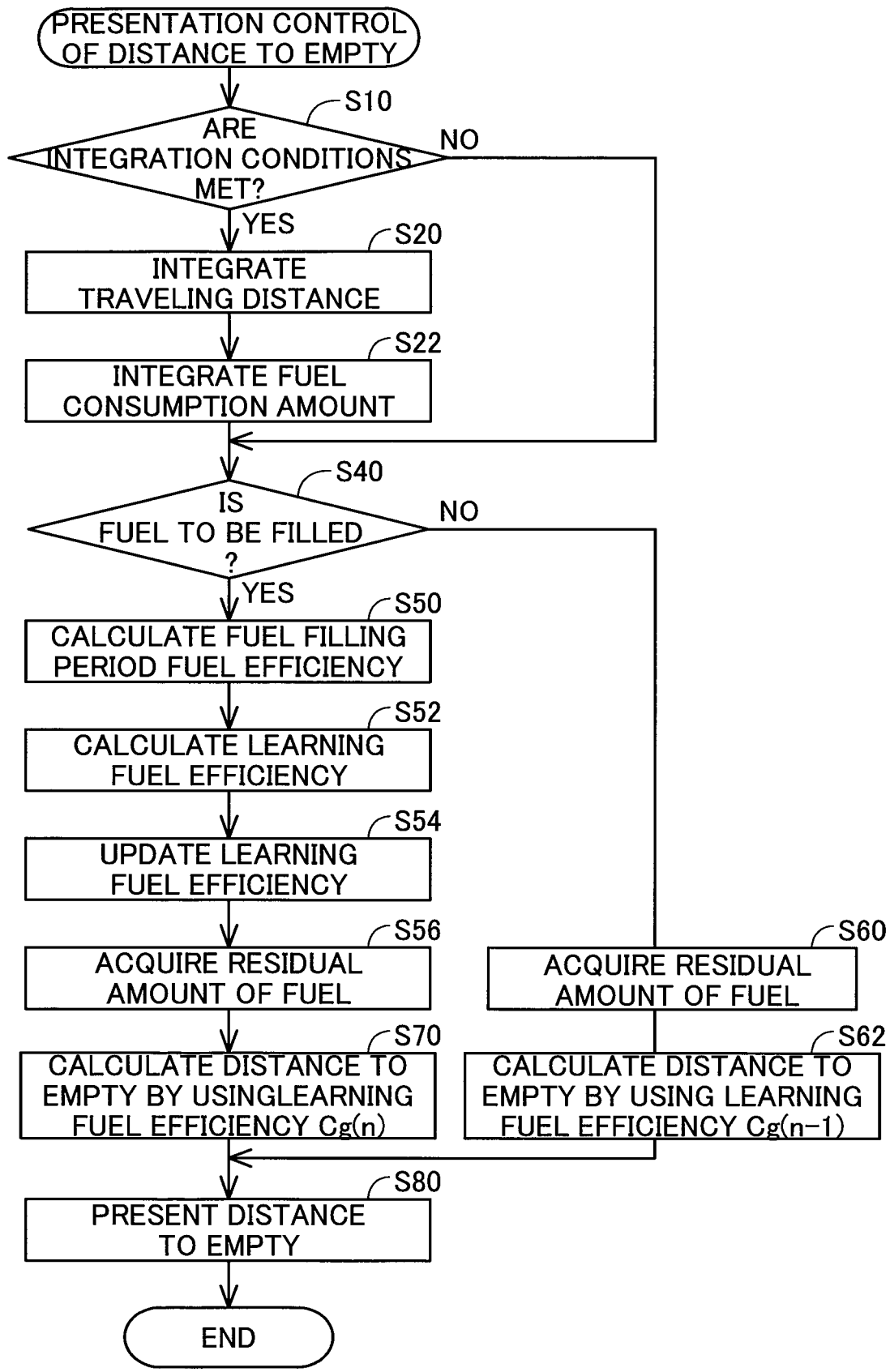
FIG. 3 is a flow diagram showing presentation control of a distance to empty.

FIG. 3 is a flow diagram showing presentation control of the distance to empty performed by the control device 40. The presentation control of the distance to empty starts when a main switch of the vehicle 200 is turned on. For example, the presentation control of the distance to empty is repeated for every one second.

The fuel consumption amount acquisition unit 43 acquires necessary information from the traveling speed acquisition unit 42 and the vehicle operation acquisition unit 44 to determine whether integration conditions are met (step S10). In the present embodiment, a case where the integration conditions are met means a case where the vehicle 200 is during traveling preparation and during traveling. The "case where the vehicle 200 is during traveling preparation and during traveling" means that an acquisition result of the operation of the vehicle 200 is not an outside power supply mode, an emergency power supply mode, and an abnormal state, and at least one of three conditions (1) to (3) below is met.

(1) Traveling speed of vehicle 200 is higher than zero
(2) Assist conditions included in traveling of vehicle 200 is met
(3) Preparation conditions necessary for traveling of fuel cell vehicle is met The fuel consumption amount acquired by the fuel consumption amount acquisition unit 43 when the integration conditions is met is also referred to as "traveling period fuel consumption amount". In order not to include backward traveling of the vehicle 200, a condition that the traveling speed of the vehicle 200 is larger than zero by an absolute value may be set as the condition (1).

For example, the condition (2) "Assist conditions included in traveling of vehicle 200" means that at least one of the conditions (2-1), (2-2) below is met.
(2-1) Traveling speed of vehicle 200 is zero in a period shorter than a predetermined period
(2-2) Battery of vehicle 200 is charged in state where traveling speed of vehicle 200 is zero Among the traveling period fuel consumption amount, the fuel consumption amount acquired by the fuel consumption amount acquisition unit 43 when the condition (2-1) is met is also referred to as "short period stop fuel consumption amount". In the present embodiment, a predetermined period set by the short period stop fuel consumption amount is five minutes. The predetermined period set by the short period stop fuel consumption amount is not limited to five minutes and may be set to an arbitrary period. For example, the predetermined period set by the short period stop fuel consumption amount is preferably close to a period in which a driver stops the vehicle 200 temporarily according to a traffic light, railroad crossing, traffic regulation or the like when the driver causes the vehicle 200 to travel. The predetermined period set by the short period stop fuel consumption amount may be changed as appropriate by learning from traveling of the vehicle 200 by the driver.

For example, the condition (3) "Preparation conditions necessary for traveling of fuel cell vehicle" includes meeting of at least one of the conditions (3-1), (3-2) below.
(3-1) At least one of purging processing or warming processing of fuel cell 30 is performed
(3-2) Check for checking whether operation of each part of vehicle 200 as a fuel cell vehicle is normal Among the traveling period fuel consumption amount, the fuel consumption amount acquired by the fuel consumption amount acquisition unit 43 when the condition (3-1) is met is also referred to as "FC processing fuel consumption amount".

When the fuel consumption amount acquisition unit 43 determines that the integration conditions are met (S10: Yes), the traveling distance acquisition unit 41 integrates the traveling distance and causes the memory to store the result (step S20), and the fuel consumption amount acquisition unit 43 integrates the fuel consumption amount, that is, the traveling period fuel consumption amount and causes the memory to store the result (step S22).

When the fuel consumption amount acquisition unit 43 determines that the integration conditions are not met (S10: No), the traveling distance acquisition unit 41 and the fuel consumption amount acquisition unit 43 do not integrate the traveling distance and the fuel consumption amount of the vehicle 200. The traveling distance acquisition unit 41 and the fuel consumption amount acquisition unit 43 do not update the integration value of the traveling distance and the integration value of the fuel consumption amount stored in the memory, and the process proceeds to step S40.

The fuel efficiency calculation unit 47 checks whether the fuel has been filled (step S40). When receiving an input of the fuel filling timing from the filling timing acquisition unit 45, the fuel efficiency calculation unit 47 determines that the fuel has been filled (S40: Yes). The fuel efficiency calculation unit 47 that has determined that the fuel has been filled acquires the integration value of the traveling distance from the traveling distance acquisition unit 41 and acquires the integration value of the fuel consumption amount from the fuel consumption amount acquisition unit 43. The fuel efficiency calculation unit 47 calculates the fuel filling period fuel efficiency Cr in the fuel filling period of this time by using the integration value of the traveling distance and the integration value of the fuel consumption amount (step S50). The fuel efficiency calculation unit 47 outputs the calculated fuel filling period fuel efficiency Cr to the learning fuel efficiency calculation unit 48.

The learning fuel efficiency calculation unit 48 that has received the input of the fuel filling period fuel efficiency Cr calculates the learning fuel efficiency Cg(n) in the fuel filling period of this time by Equation (1) by using the acquired fuel filling period fuel efficiency Cr and the learning fuel efficiency Cg(n−1) that has been calculated previously and is stored in the memory (step S52). The learning fuel efficiency calculation unit 48 outputs the calculated learning fuel efficiency Cg(n) in the fuel filling period of this time to the distance-to-empty calculation unit 49, and causes the memory to store the calculated learning fuel efficiency Cg(n) in the fuel filling period of this time as the learning fuel efficiency Cg(n−1) to update the learning fuel efficiency Cg(n−1) stored in the memory (step S54). At the time of updating of the learning fuel efficiency Cg(n−1), the integration value of the traveling distance of the traveling distance acquisition unit 41 and the integration value of the fuel consumption amount of the fuel consumption amount acquisition unit 43 may be reset.

When the learning fuel efficiency Cg(n−1) is updated, the fuel efficiency calculation unit 47 acquires the residual amount of the fuel in the fuel tank 70 (step S56). The distance-to-empty calculation unit 49 calculates the distance to empty by using the learning fuel efficiency Cg(n) output from the learning fuel efficiency calculation unit 48 and the residual amount of the fuel acquired by the fuel residual amount acquisition unit 46 (step S70). The distance-to-empty calculation unit 49 outputs the calculated distance to empty to the presentation device 80.

When the fuel efficiency calculation unit 47 has not received the input of the fuel filling timing from the filling timing acquisition unit 45 (S40: No), the fuel efficiency calculation unit 47 does not calculate the fuel filling period fuel efficiency, the learning fuel efficiency calculation unit 48 does not update the learning fuel efficiency Cg(n−1) stored in the memory, and the process proceeds to step S60. The fuel efficiency calculation unit 47 acquires the residual amount of the fuel in the fuel tank 70 (step S60). The distance to empty calculation unit 49 calculates the distance to empty by using the existing learning fuel efficiency Cg(n−1) and the residual amount of the fuel acquired from the fuel residual amount acquisition unit 46 (step S62). The distance to empty calculation unit 49 outputs the calculated distance to empty to the presentation device 80. The presentation device 80 presents the acquired distance to empty (step S80). The presentation control of the distance to empty ends by presentation of the distance to empty by the presentation device 80.

Figure 4:
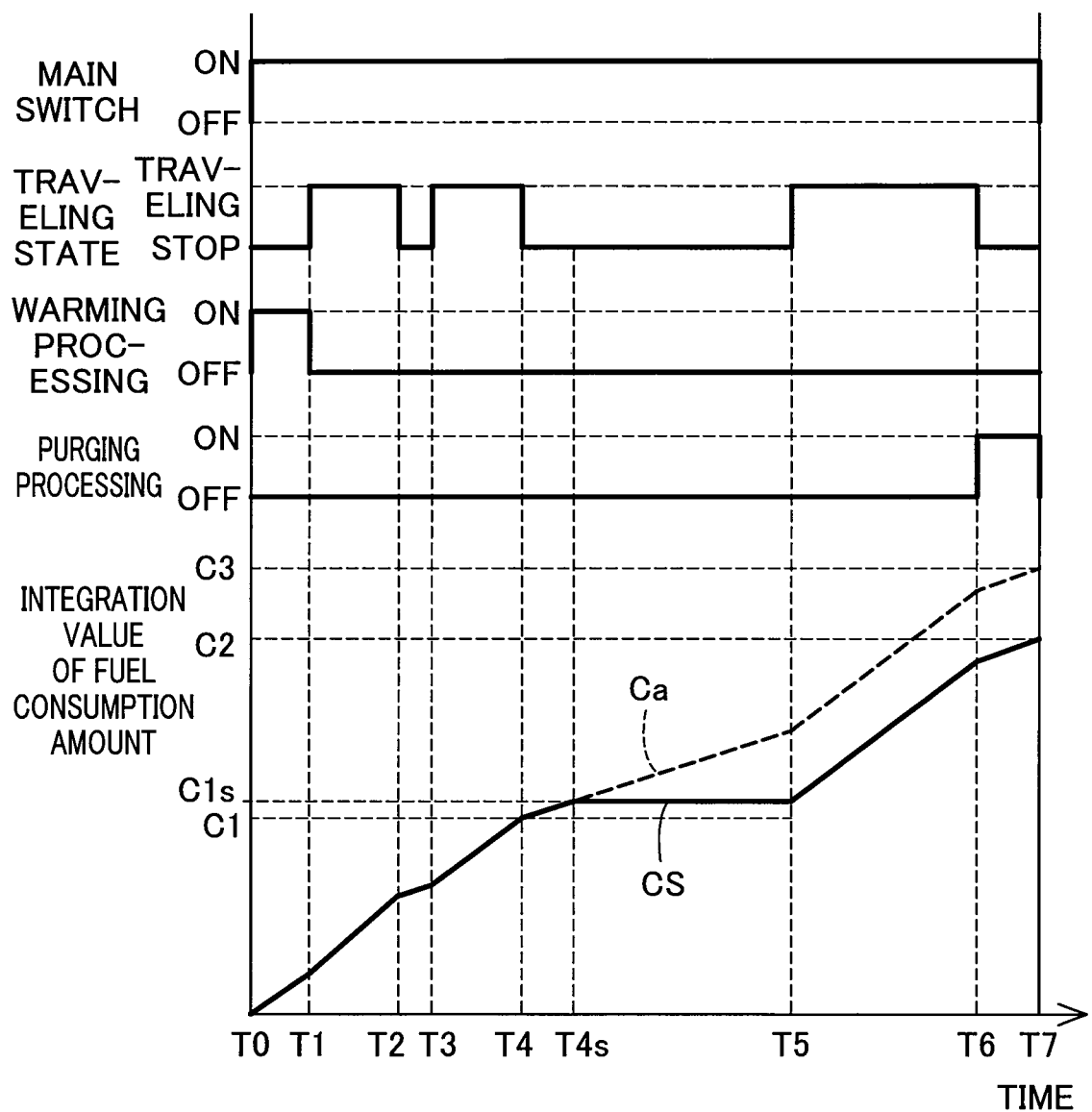
FIG. 4 is an explanatory diagram schematically showing a relationship between control of each part of the vehicle and an integration value of a fuel consumption amount.

FIG. 4 is an explanatory diagram schematically representing a relationship between control of each part of the vehicle 200 and the integration value of the fuel consumption amount. FIG. 4 shows, in order from the uppermost part, on and off of the main switch of the vehicle 200, a state of traveling or stop of the vehicle 200, on and off of the warming processing of the fuel cell 30, and on and off of the purging processing of the fuel cell 30. In the lowermost part of FIG. 4, a graph in which the horizontal axis is the time axis and the vertical axis is the integration value of the fuel consumption amount is shown. In the graph of FIG. 4, transition CS of the integration value of the fuel consumption amount calculated by the fuel efficiency calculation unit 47 is shown by a solid line, and transition Ca of the integration value of the fuel consumption amount actually consumed in the fuel cell 30 is shown by a broken line. The time axis shown in the horizontal axis is common in items of the vertical axis of FIG. 4. Time T0 and time T7 are filling timings when the fuel is filled in the vehicle 200. A period from time T2 to time T3 is shorter than a predetermined period (in the present embodiment, five minutes). A period from time T4 to time T4s is equal to the predetermined period (in the present embodiment, five minutes), and a period from time T4 to time T5 and a period from time T4s to time T5 are longer than the predetermined period.

In the vehicle 200, presentation control of the distance to empty by the control device 40 starts when the main switch is turned on at time T0 when the fuel is filled. During the period from time T0 to time T1, the warming processing of the fuel cell 30 is performed. In the present embodiment, the period in which the warming processing of the fuel cell 30 is performed meets the integration conditions, and the fuel consumption amount acquisition unit 43 integrates the fuel consumption amount in the period from time T0 to time T1, that is, the FC processing fuel consumption amount. In the period from time T1 to time T2, the state is a traveling state where the traveling speed of the vehicle 200 is higher than zero, the integration conditions are met, and the fuel consumption amount acquisition unit 43 integrates the fuel consumption amount in the period from time T1 to time T2, that is, the traveling period fuel consumption amount. Note that in the period from time T3 to time T4 and the period from time T5 to time T6 are similar to the period from time T1 to time T2, and the fuel consumption amount acquisition unit 43 integrates the traveling period fuel consumption amount.

In the period from time T2 to time T3, the vehicle 200 stops for a period less than a predetermined period. In the present embodiment, the condition (2-1) is met at the stop time when the traveling speed of the vehicle 200 is zero, and the fuel consumption amount acquisition unit 43 determines that the integration conditions are met and starts integration of the fuel consumption amount. In the period from the stop time of the vehicle 200 until five minutes that is the predetermined period passes, the fuel consumption amount acquisition unit 43 acquires the integration value of the fuel consumption amount as the short period stop fuel consumption amount. The fuel consumption amount acquisition unit 43 integrates the fuel consumption amount in the period from time T2 to time T3, that is, the short period stop fuel consumption amount.

In the period from time T4 to time T5, the vehicle 200 stops for a period equal to or longer than the predetermined period. In the present embodiment, when the stop state of the vehicle 200 continues for five minutes, the predetermined period, or more, the fuel consumption acquisition unit 43 acquires the integration value of the fuel consumption amount as the short period stop fuel consumption amount for a period from the stop time of the vehicle 200 until five minutes elapses, and determines that the condition (2-1) is not met and the integration conditions are not met in the period after five minutes has elapsed from the stop time, and stops integration of the fuel consumption amount. In FIG. 4, since the period from time T4 to time T4s is equal to the predetermined period, the fuel consumption amount acquisition unit 43 integrates the fuel consumption amount as the short period stop fuel consumption amount during the period from time T4 that is the stop time of the vehicle 200 to time T4s, and acquires an integration value Cis. During the period from time T4s at which five minutes has elapsed from the stop time to time T5 at which traveling is resumed, the fuel consumption amount acquisition unit 43 stops integration of the fuel consumption amount.

Note that, as shown as the transition Ca of FIG. 4, during the period from time T4 to time T5, the vehicle 200 stops in a traveling enabled state which is so-called idling, and consumes the fuel by the fuel cell 30, and the fuel consumption amount increases.

During the period from time T6 to time T7, the purging processing of the fuel cell 30 is performed. In the present embodiment, in the period in which the purging processing of the fuel cell 30 is performed, the integration conditions are met, so that the fuel consumption amount acquisition unit 43 integrates the fuel consumption amount in the period from time T6 to time T7, that is, the FC processing fuel consumption amount. At time T7, the integration value of the fuel consumption amount of the transition CS is C2 and the integration value of the fuel consumption amount of the transition Ca is C3. The integration value C2 is smaller than the integration value C3 by an amount of not-integrated fuel consumption amount from time T4s to time T5. At time T7, when the fuel filling in the vehicle 200 is performed, the fuel efficiency calculation unit 47 calculates the fuel filling period fuel efficiency by using the integration value of the traveling distance in the fuel filling period from time T0 to time T7 and the integration value C2 of the fuel consumption amount. The fuel filling period fuel efficiency calculated by using the integration value C2 is larger than the fuel filling period fuel efficiency calculated by using the integration value C3, by an amount of not-integrated fuel consumption amount during the stop period of the vehicle 200 from time T4s to time T5. As Similar to this, the learning fuel efficiency and the distance to empty calculated by using the integration value C2 are also larger than those in the case of using the integration value C3.

As described above, according to the distance-to-empty presentation apparatus 100 of the present embodiment, the fuel filling period fuel efficiency Cr is calculated by using the traveling period fuel consumption amount in the case where the vehicle 200 is during traveling preparation and during traveling. The fuel filling period fuel efficiency is calculated by using the fuel consumption amount used during the traveling, not including the fuel consumption amount at the time of stop of the vehicle 200. Therefore, an appropriate distance to empty based on the fuel consumption amount necessary for traveling of the vehicle 200 can be calculated and presented.

According to the distance-to-empty presentation apparatus 100 of the present embodiment, the learning fuel efficiency calculation unit 48 calculates the learning fuel efficiency Cg(n) of this time by the weighted average of the learning fuel efficiency Cg(n−1) previously and the fuel filling period fuel efficiency Cr in the fuel filling period. Since the learning fuel efficiency is sequentially updated for each filling timing, the fuel efficiency calculation accuracy can be improved on the basis of the traveling results of the vehicle 200. By using the weighted average, influence of variation of the fuel consumption amount for each fuel filling period can be suppressed.

According to the distance-to-empty presentation apparatus 100 of the present embodiment, in calculation of the fuel filling period fuel efficiency Cr, the fuel efficiency calculation unit 47 further includes in the traveling period fuel consumption amount the short period stop fuel consumption amount when the vehicle 200 stops for a period less than the predetermined period. By reflecting the fuel consumption amount by temporary stop that occurs during the traveling of the vehicle 200 in the fuel filling period fuel efficiency, the distance to empty under conditions close to actual conditions of the traveling of the vehicle 200 can be calculated and presented.

According to the distance-to-empty presentation apparatus 100 of the present embodiment, in calculation of the fuel filling period fuel efficiency Cr, the fuel efficiency calculation unit 47 further includes in the traveling period fuel consumption amount the FC processing fuel consumption amount that is a fuel consumption amount in a period in which purging processing and warming processing of the fuel cell 30 is performed. By reflecting the fuel consumption amount by the processing of the fuel cell 30 necessary for traveling of the fuel cell vehicle in the fuel filling period fuel efficiency calculation, the distance to empty under conditions close to actual conditions of the traveling of the fuel cell vehicle can be calculated and presented.

Figure 5:
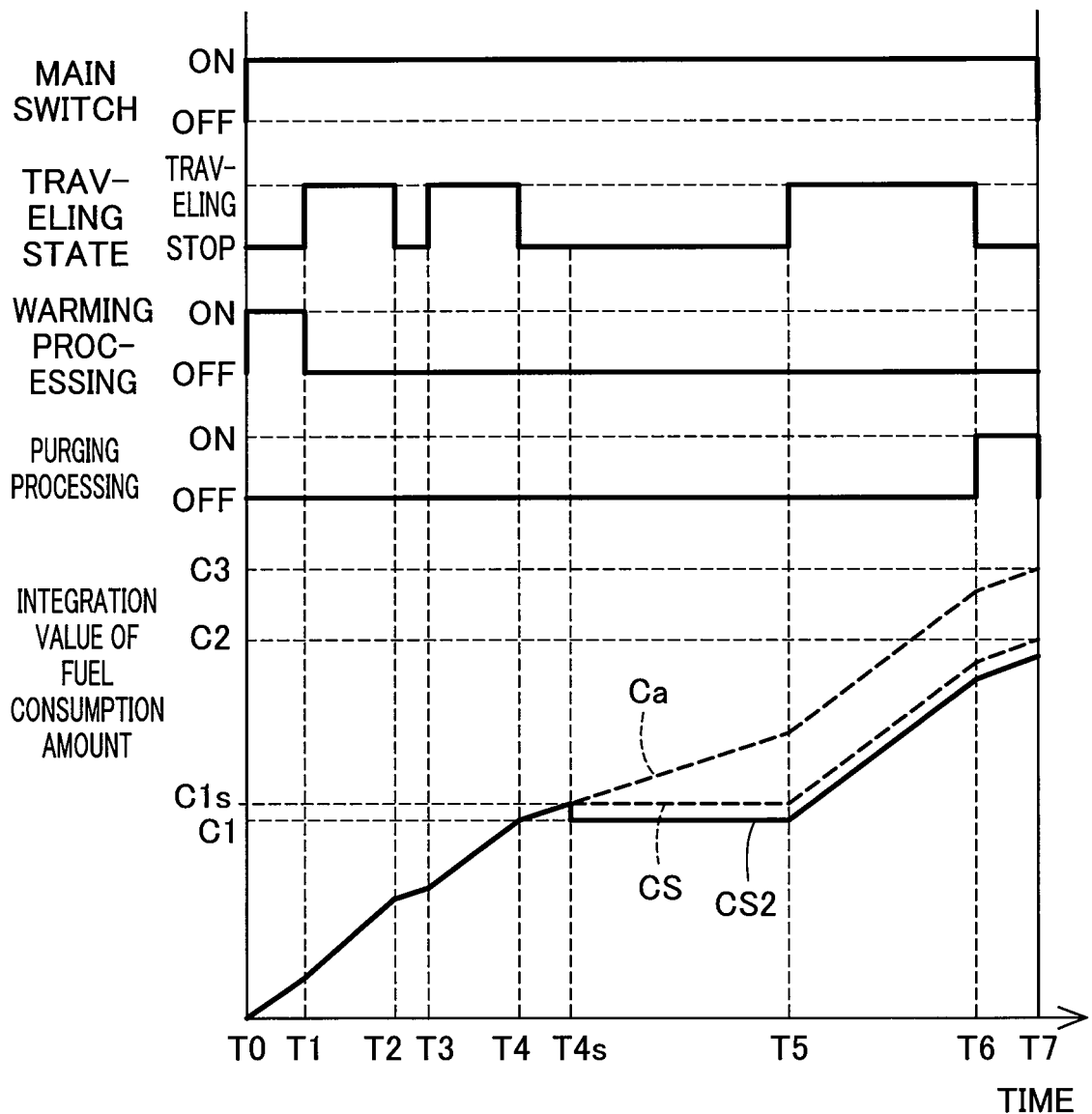
FIG. 5 is an explanatory diagram schematically representing transition of integration values of the fuel consumption amount by presentation control of distance to empty in another embodiment.

B. Another Embodiment (B1) FIG. 5 is an explanatory diagram schematically representing transition of the integration value of the fuel consumption amount by the fuel consumption amount acquisition unit 43 in another embodiment. As a reference example, FIG. 5 shows by broken lines the transition CS of the integration value of the fuel consumption amount in the first embodiment and the transition Ca of the integration value of the fuel consumption amount that is actually consumed in the fuel cell 30. In the first embodiment, when the stop state of the vehicle 200 continues for a period equal to or longer than the predetermined period, the fuel consumption amount acquisition unit 43 integrates the fuel consumption amount as the short period stop fuel consumption amount for a period in which the predetermined period elapses from the stop time of the vehicle 200, and stops integration of the fuel consumption amount in the period after the predetermined period elapses from the stop time. On the other hand, when, for the stop state of the vehicle 200, the predetermined period has passed from the stop time, the fuel consumption amount acquisition unit 43 may use the integration value of the fuel consumption amount at the stop time of the vehicle 200 as the integration value of the fuel consumption amount at the time when the stop period of the vehicle 200 ends, regardless of whether the fuel consumption amount is integrated from the stop time of the vehicle 200. For example, as shown in FIG. 5 as the transition CS2, The fuel consumption amount acquisition unit 43 starts integration of the fuel consumption amount from time T4 which is the stop time of the vehicle 200, discards the integration value C1s of the fuel consumption amount integrated from time T4 to time T4s at time T4s at which the predetermined period has elapsed, and causes the memory to store the integration value C1 of the fuel consumption amount at the stop time of the vehicle 200 as the integration value. At time T5 at which the traveling of the vehicle 200 is resumed, the integration of the fuel consumption amount with respect to the integration value C1 may be continued. The timing of discarding the integration value of the fuel consumption amount integrated in the stop period of the vehicle 200 and causing the memory to store the integration value C1 of the fuel consumption amount at the stop time of the vehicle 200 as the integration value may be an arbitrary time from time T4 to time T5 such as time when the traveling of the vehicle 200 is resumed at time T5, for example. According to the distance-to-empty presentation device 100 of this embodiment, the fuel consumption amount at the time of long period stop is calculated more correctly so that the fuel consumption amount used in traveling can be calculated more correctly. Therefore, a more appropriate distance to empty can be calculated and presented.

(B2) In the above embodiment, the learning fuel efficiency calculation unit 48 calculates the learning fuel efficiency Cg(n) of this time by using the fuel filling period fuel efficiency Cr calculated this time and the learning fuel efficiency Cg(n−1) calculated previously. On the other hand, for example, the learning fuel efficiency calculation unit 48 may calculate the learning fuel efficiency Cg(n) by using the weighted average of the fuel filling period fuel efficiency Cr calculated this time and the fuel filling period fuel efficiency Cr calculated previously. According to the distance-to-empty presentation apparatus 100 of this embodiment, the learning fuel efficiency using the fuel filling period fuel efficiency Cr calculated most recently can be calculated.

(B3) In the above embodiment, the control device 40 includes the learning fuel efficiency calculation unit 48. On the other hand, the control device 40 may not include the learning fuel efficiency calculation unit 48. In the distance-to-empty presentation apparatus 100 of this embodiment, the distance-to-empty calculation unit 49 calculates the distance to empty of the fuel cell vehicle by using the fuel filling period fuel efficiency Cr calculated by the fuel efficiency calculation unit 47 and the residual amount of the fuel. Even in the distance-to-empty presentation apparatus 100 of this embodiment, the fuel filling period fuel efficiency is calculated by using the fuel consumption amount used in the traveling not including the fuel consumption amount at the time of stop of the vehicle 200, and therefore, an appropriate distance to empty based on the fuel consumption amount necessary for traveling of the vehicle 200 can be calculated and presented.

(B4) In the description of the above embodiment, the case where the integration conditions are met is, for example, a case where an acquisition result of the operation of the vehicle 200 is not an outside power supply mode, an emergency power supply mode, and an abnormal state and at least one of three conditions (1) to (3) is met. On the other hand, the case where the integration conditions are met may be set as a case where an acquisition result of the operation of the vehicle 200 is not an outside power supply mode, an emergency power supply mode, and an abnormal state and only the condition (1) is met. The traveling period fuel consumption amount may not include the short period stop fuel consumption amount and the FC processing fuel consumption amount. In the distance-to-empty presentation apparatus 100 of this embodiment, the filling period fuel efficiency is calculated by using the fuel consumption amount consumed in the traveling of the vehicle 200 without using the fuel consumption amount in the state where the vehicle 200 is being stop, and therefore, an appropriate distance to empty based on the fuel consumption amount used in the traveling of the vehicle 200 can be calculated and presented.

(B5) In the description of the above embodiment, the case where the integration conditions are met is, for example, a case where an acquisition result of the operation of the vehicle 200 is not an outside power supply mode, an emergency power supply mode, and an abnormal state and at least one of three conditions (1) to (3) is met. On the other hand, the case where the integration conditions are met may be set as a case where an acquisition result of the operation of the vehicle 200 is not an outside power supply mode, an emergency power supply mode, and an abnormal state and at least one of the condition (1) or the condition (2) is met. The traveling period fuel consumption amount may include the short period stop fuel consumption amount and may not include the FC processing fuel consumption amount. In the distance-to-empty presentation apparatus 100 of this embodiment, the filling period fuel efficiency is calculated by using the fuel consumption amount consumed in the traveling of the vehicle 200 without using the fuel consumption amount in the state where the vehicle 200 is being stop, and therefore, an appropriate distance to empty based on the fuel consumption amount used in the traveling of the vehicle 200 can be calculated and presented.

(B6) In the description of the above embodiment, the case where the integration conditions are met is, for example, a case where an acquisition result of the operation of the vehicle 200 is not an outside power supply mode, an emergency power supply mode, and an abnormal state and at least one of three conditions (1) to (3) is met. On the other hand, the case where the integration conditions are met may be set as a case where an acquisition result of the operation of the vehicle 200 is not an outside power supply mode, an emergency power supply mode, and an abnormal state and at least one of the condition (1) or the condition (3) is met. The traveling period fuel consumption amount may not include the short period stop fuel consumption amount and may include the FC processing fuel consumption amount. In the distance-to-empty presentation apparatus 100 of this embodiment, the filling period fuel efficiency is calculated by using the fuel consumption amount consumed in the traveling of the vehicle 200 without using the fuel consumption amount in the state where the vehicle 200 is being stop, and therefore, an appropriate distance to empty based on the fuel consumption amount used in the traveling of the vehicle 200 can be calculated and presented.

The control unit and the technique thereof described in the present disclosure may be achieved by a dedicated computer provided by configuring a processor and a memory that are programmed so as to execute one or a plurality of functions embodied by a computer program. Otherwise, the control unit and the technique thereof described in the present disclosure may be achieved by a dedicated computer provided by configuring a processor by one or more dedicated hardware logical circuits. Alternatively, the control unit and the technique thereof described in the present disclosure may be achieved by one or more dedicated computers configured by a combination of a processor and a memory that are programmed so as to execute one or a plurality of functions and a processor by one or more hardware logical circuits. Furthermore, a computer program may be stored in a non-temporary tangible recording medium that is computer readable, as an instruction to be executed by a computer.

The present disclosure is not limited to the embodiments described above, and can be achieved with various configurations without departing from the scope of the gist of the present disclosure. For example, the technical features of the embodiment may be replaced or combined with each other as appropriate in order to solve a part or all of the problems described above, or achieve a part or all of the effect described above. Unless being described as an essential in this specification, the technical feature may be deleted as appropriate. For example, the present disclosure may be achieved by the embodiments described below.

(1) According to an aspect of the present disclosure, a distance-to-empty presentation apparatus of a fuel cell vehicle is provided. This distance-to-empty presentation apparatus includes: a traveling speed acquisition unit configured to acquire a traveling speed of the fuel cell vehicle; a traveling distance acquisition unit configured to acquire a traveling distance of the fuel cell vehicle in a fuel filling period, the fuel filling period is a period from the time when the fuel is filled in the fuel cell vehicle previously to the time when the fuel is filled in the fuel cell vehicle this time; a fuel residual amount acquisition unit configured to acquire a fuel residual amount of the fuel cell vehicle; a fuel consumption amount acquisition unit configured to acquire a fuel consumption amount of the fuel cell vehicle; a fuel efficiency calculation unit configured to calculate fuel filling period fuel efficiency by using the traveling distance in the fuel filling period and a traveling period fuel consumption amount that is the fuel consumption amount during traveling preparation and during traveling in the fuel filling period, wherein the fuel filling period fuel efficiency is fuel efficiency in the fuel filling period; a distance-to-empty calculation unit configured to calculate a distance to empty of the fuel cell vehicle by using the fuel filling period fuel efficiency and the fuel residual amount; and a presentation device configured to present the distance to empty that has been calculated. According to the distance-to-empty presentation apparatus of this aspect, the fuel filling period fuel efficiency is calculated by using the traveling period fuel consumption amount when the fuel cell vehicle is in traveling preparation or traveling. The fuel filling period fuel efficiency is calculated by using the fuel consumption amount used in the traveling without including the fuel consumption amount at the time of vehicle stop. Therefore, an appropriate distance to empty based on the fuel consumption amount necessary for vehicle traveling can be calculated and presented.

(2) The distance-to-empty presentation apparatus of the aspect described above may include a learning fuel efficiency calculation unit configured to calculate learning fuel efficiency by using the fuel filling period fuel efficiency that has been calculated this time and the fuel filling period fuel efficiency that has been calculated previously. According to the distance-to-empty presentation apparatus of this aspect, learning fuel efficiency can be calculated by using fuel filling period fuel efficiency that has been calculated most recently.

(3) In the distance-to-empty presentation apparatus of the aspect described above, the learning fuel efficiency calculation unit may calculate the learning fuel efficiency by using the learning fuel efficiency that has been calculated previously instead of the fuel filling period fuel efficiency that has been calculated previously. According to the distance-to-empty presentation apparatus of this aspect, learning fuel efficiency is sequentially updated for each timing when the fuel is filled, and therefore, fuel efficiency calculation accuracy can be improved on the basis of traveling results of the fuel cell vehicle.

(4) In the distance-to-empty presentation apparatus of the aspect described above, in calculation of the fuel filling period fuel efficiency, the fuel efficiency calculation unit may further include in the traveling period fuel consumption amount, a short period stop fuel consumption amount that is the fuel consumption amount during the fuel cell vehicle stops for a period shorter than a predetermined period in the fuel filling period. According to the distance-to-empty presentation apparatus of this aspect, a fuel consumption amount in temporary stop that occurs during vehicle traveling is reflected in the fuel filling period fuel efficiency, and therefore, a distance to empty under conditions that are close to actual vehicle traveling conditions can be calculated and presented.

(5) In the distance-to-empty presentation apparatus of the aspect described above, in the calculation of the fuel filling period fuel efficiency, the fuel consumption calculation unit may further include in the traveling period fuel consumption amount, an FC processing fuel consumption amount that is the fuel consumption amount in a period in which at least one of purging processing or warming processing of the fuel cell is performed in the fuel filling period. According to the distance-to-empty presentation apparatus of this aspect, a fuel consumption amount in processing of a fuel cell necessary for fuel cell vehicle traveling is reflected in calculation of the fuel filling period fuel efficiency, and therefore, a distance to empty under conditions that are close to actual fuel cell vehicle traveling conditions can be calculated and presented.

The present disclosure can be achieved in various aspects other than the distance-to-empty presentation apparatus. For example, the present disclosure can be achieved in aspects of a moving body including a distance-to-empty presentation apparatus, a calculation method of fuel consumption, a fuel consumption calculation apparatus, a presentation method and a calculation method of a distance to empty, a control method of a fuel consumption calculation apparatus and a control method of a distance-to-empty presentation apparatus, a computer program for achieving the control method, a non-temporary recording medium in which the computer program is recorded, and the like.

What is claimed is:

1. A distance-to-empty presentation apparatus of a fuel cell vehicle, the distance-to-empty presentation apparatus comprising:
a traveling speed acquisition unit configured to acquire a traveling speed of the fuel cell vehicle;
a traveling distance acquisition unit configured to acquire a traveling distance of the fuel cell vehicle in a fuel filling period, the fuel filling period is a period running from a previous time when the fuel is filled in the fuel cell vehicle to a current time when the fuel is filled in the fuel cell vehicle;
a fuel residual amount acquisition unit configured to acquire a fuel residual amount of the fuel cell vehicle;
a fuel consumption amount acquisition unit configured to acquire a traveling period fuel consumption amount of the fuel cell vehicle, the traveling period fuel consumption amount being a fuel consumption amount during travel preparation and during traveling in the fuel filling period, wherein the fuel consumption amount acquisition unit stops integration of the traveling period fuel consumption amount during a stop of the fuel cell vehicle for a period of time equal to or greater than a predetermined period;
a fuel efficiency calculation unit configured to calculate a fuel filling period fuel efficiency by using the traveling distance in the fuel filling period and the traveling period fuel consumption amount, wherein the fuel filling period fuel efficiency is a fuel efficiency in the fuel filling period;

a distance-to-empty calculation unit configured to calculate a distance to empty of the fuel cell vehicle by using the fuel filling period fuel efficiency and the fuel residual amount;

a presentation device configured to present the distance to empty that has been calculated; and a learning fuel efficiency calculation unit configured to calculate a learning fuel efficiency by using the fuel filling period fuel efficiency that has been calculated in the fuel filling period and a fuel filling period fuel efficiency that has been calculated previously, wherein the learning fuel efficiency calculation unit calculates the learning fuel efficiency by using Equation (1) below, $$Cg(n) = k1 \cdot Cg(n-1) + (1-k1)Cr \qquad \text{Equation (1):}$$

wherein
- k1 is a predetermined coefficient,
- Cg(n) is the learning fuel efficiency calculated in the fuel filling period,
- Cg(n−1) is a learning fuel efficiency calculated previously, and
- Cr is the fuel filling period fuel efficiency calculated in the fuel filling period.

2. The distance-to-empty presentation apparatus according to claim 1,
wherein the learning fuel efficiency calculation unit calculates the learning fuel efficiency by using a learning fuel efficiency that has been calculated previously instead of the fuel filling period fuel efficiency that has been calculated previously.

3. The distance-to-empty presentation apparatus according to claim 1,
wherein the fuel efficiency calculation unit, in calculating the fuel filling period fuel efficiency,
further includes, in the traveling period fuel consumption amount, a short period stop fuel consumption amount that is a fuel consumption amount during a stop of the fuel cell vehicle for a period of time shorter than the predetermined period in the fuel filling period.

4. The distance-to-empty presentation apparatus according to claim 1,
wherein the fuel efficiency calculation unit, in calculating the fuel filling period fuel efficiency,
further includes, in the traveling period fuel consumption amount, an FC processing fuel consumption amount that is a fuel consumption amount in a period in which at least one of purging processing or warming processing of the fuel cell is performed in the fuel filling period.

5. A presentation method of a distance to empty of a fuel cell vehicle, the method comprising:

acquiring a traveling speed of the fuel cell vehicle;

acquiring a traveling distance of the fuel cell vehicle in a fuel filling period, the fuel filling period is a period running from a previous time when the fuel is filled in the fuel cell vehicle to a current time when the fuel is filled in the fuel cell vehicle;

acquiring a fuel residual amount of the fuel cell vehicle;

acquiring a traveling period fuel consumption amount of the fuel cell vehicle, the traveling period fuel consumption amount being a fuel consumption amount during travel preparation and during traveling in the fuel filling period, wherein the fuel consumption amount acquisition unit stops integration of the traveling period fuel consumption amount during a stop of the fuel cell vehicle for a period of time equal to or greater than a predetermined period;

calculating fuel filling period fuel efficiency by using the traveling distance in the fuel filling period and the traveling period fuel consumption amount, wherein the fuel filling period fuel efficiency is a fuel efficiency in the fuel filling period;

calculating a distance to empty of the fuel cell vehicle by using the fuel filling period fuel efficiency and the fuel residual amount;

presenting the distance to empty that has been calculated; and calculating a learning fuel efficiency by using the fuel filling period fuel efficiency that has been calculated in the fuel filling period and a fuel filling period fuel efficiency that has been calculated previously, wherein calculating the learning fuel efficiency uses Equation (1) below, $$Cg(n) = k1 \cdot Cg(n-1) + (1-k1)Cr \qquad \text{Equation (1):}$$

wherein
- k1 is a predetermined coefficient,
- Cg(n) is the learning fuel efficiency calculated in the fuel filling period,
- Cg(n−1) is a learning fuel efficiency calculated previously, and
- Cr is the fuel filling period fuel efficiency calculated in the fuel filling period.

* * * * *